United States Patent [19]

Montgomery

[11] 4,246,530
[45] Jan. 20, 1981

[54] MEMORY NETWORK FOR TDM SWITCHING SYSTEM

[75] Inventor: Billy A. Montgomery, Milan, Tenn.

[73] Assignee: International Telephone and Telegraph Corporation, New York, N.Y.

[21] Appl. No.: 965,851

[22] Filed: Dec. 4, 1978

[51] Int. Cl.³ .............................................. H04Q 11/04
[52] U.S. Cl. .......................................... 370/58; 370/68
[58] Field of Search ........ 179/15 AT, 15 AQ, 15 BE; 370/58, 62, 68, 13

[56] References Cited

U.S. PATENT DOCUMENTS

| | | | |
|---|---|---|---|
| 3,941,936 | 3/1976 | Graham | 179/15 AT |
| 3,967,070 | 6/1976 | Srivastava | 179/15 AT |
| 3,987,251 | 10/1976 | Texier | 179/15 AT |
| 4,160,876 | 7/1979 | Bojanek | 179/15 AT |

*Primary Examiner*—David L. Stewart

*Attorney, Agent, or Firm*—James B. Raden; Marvin M. Chaban

[57] ABSTRACT

A memory network for a time division system. In memory for each time slot are stored the addresses of the telephone lines using that time slot. A call is processed by transferring addresses and control between time slots associated with various call functions such as registering dial pulses (register), supervising local calls (link) or supervising trunk calls (trunk). The addresses are sequentially brought from memory in the respective intervals representing the time slots in which the addresses are stored and retained in those time slots or transferred. For each time slot in which an address transfer occurs, a record of a transfer having been made is retained temporarily for that time slot. Reference is made to that record before a new address is stored in memory to prevent inadvertent errors causing address changes in memory.

7 Claims, 3 Drawing Figures

MEMORY NETWORK FOR TDM SWITCHING SYSTEM

BACKGROUND OF THE INVENTION

The present invention was developed for systems of the type shown in U.S. Pat. No. 3,941,936 issued Mar. 2, 1976 to K. Graham et al and in U.S. Pat. No. 3,997,738 issued Dec. 14, 1976 to V. Korsky et al. In the system shown by those patents, the main memory is a recirculating one in which various system functions are performed during one of a group of time slots allotted for that function. Switching from function to function occurs during a predetermined group of time slots in which the addresses of the stations involved in call processing are transferred from one time slot to a new time slot representing the function to be performed by the system.

In such systems, noise entering the system can produce binary data errors, or such errors can be produced through other means. Such errors can cause lost or dropped calls and other problems injurious to proper call handling.

SUMMARY OF THE INVENTION

The present invention provides a means of determining when data is being changed in a specific time slot and using this determination to verify the presence of a data change. In the absence of the verification, no change is made in the data stored. In this way, a random access memory sequentially addressed may be used as the recirculating memory of a time division telecommunications system.

It is therefore an object of the present invention to provide a memory for a recirculating system in which data may be changed in each time slot during predetermined intervals, and in which the memory may employ a random access memory rather than the usual shift registers.

It is a further object of the invention to provide a clocked ROM and a RAM to produce the same storage as a variable length shift register.

It is a further object of the invention to provide a telecommunications system which uses a random access memory as the main storage for changing data within a time division telecommunications system.

It is a still further object of the invention to provide a recirculating memory system for a time division telephone system using random access memory in which memory data is changed during specific intervals and the memory data is changed only when properly verified.

The present invention uses RAM memory as the main system memory for storing the data to be presented for inspection and possible change by the surrounding circuitry. This RAM memory is addressed via a counter in such a way that the output of the RAM appears to be coming from a shift register This output data is then shifted through four steps. The data at certain of these steps in time may be changed purposely by the surrounding circuits, or it may be erroneously altered by conditions such as by noise. if the data was purposely changed at one of the steps, an indication is stored of a change having been made and this indication is shifted in synchronism with the data. After data has been presented at each of the four steps, it is then returned to an input port of the RAM memory. If the data had been purposely changed (determined by looking at the previously mentioned memory which was shifted in synchronism with the data), then the data at the input port is written into the RAM at the proper location. If the data was not changed, the new data is not written into the RAM. Thus, the original data is maintained in the RAM and is not altered because noise might have affected the data as it was shifted out for presentation to the surrounding circuits.

In the system shown, there is provided a memory arrangement for the addresses of originating calls of the exchange and an essentially identical memory arrangement for terminating call data. Both memory arrangements are clocked simultaneously so that time slots for both originate and terminate are clocked simultaneously.

DETAILED DESCRIPTION OF THE DRAWINGS

Figure 1A:
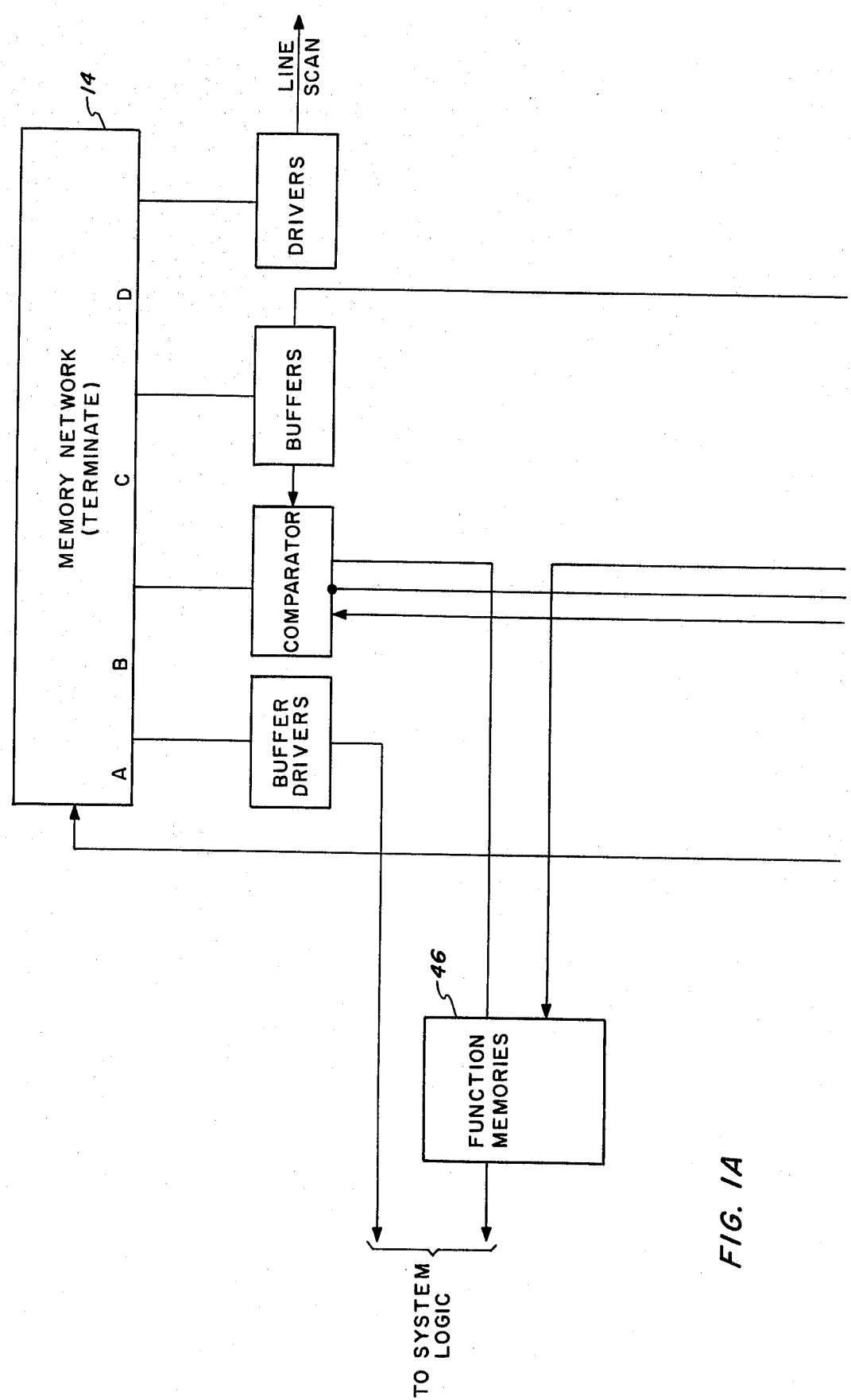
FIG. 1 is a schematic block diagram showing the use of my memory network within a system with FIG. 1B placed below FIG. 1A.
Figure 1B:
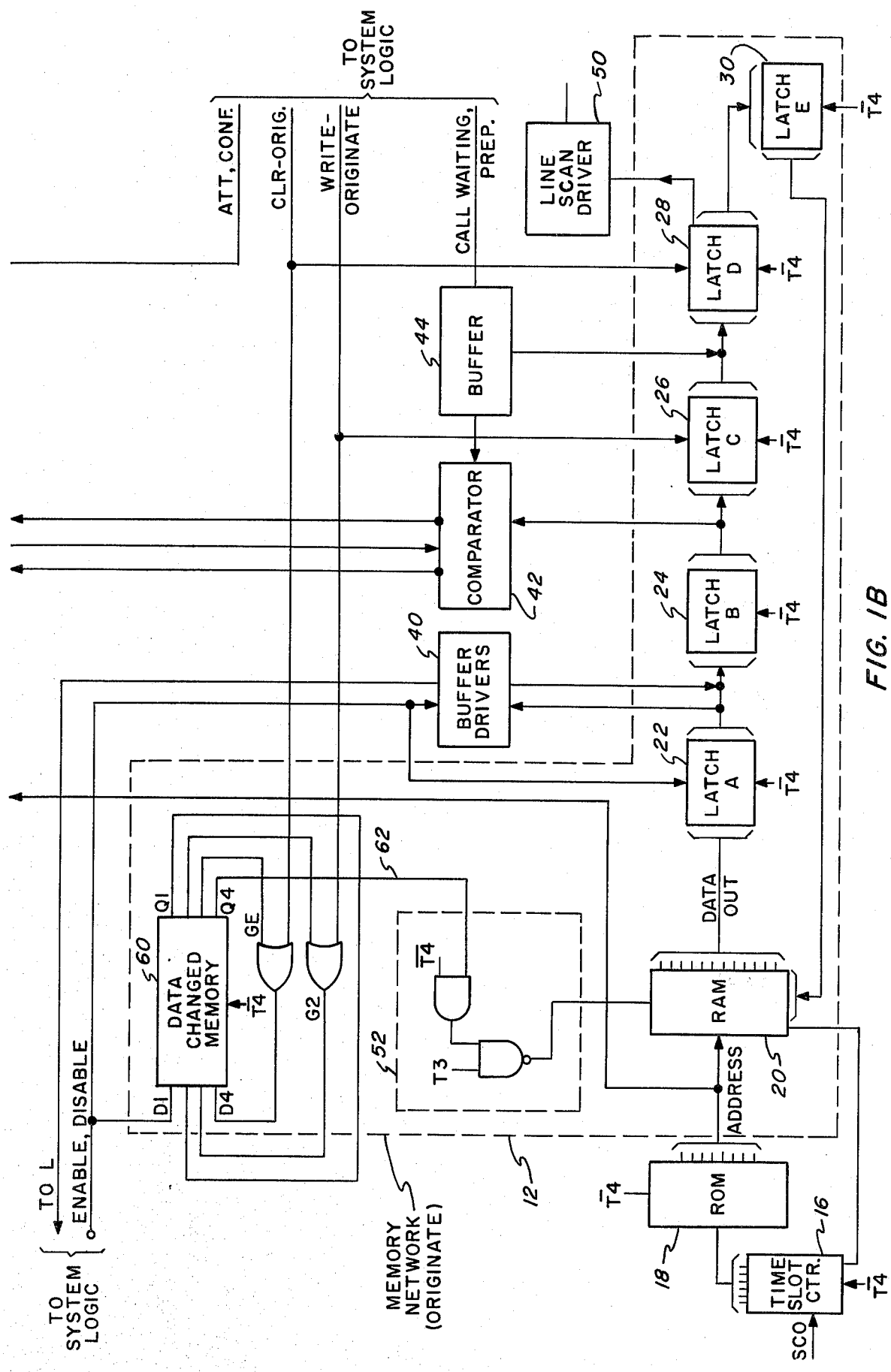

Reference is made to U.S. Pat. No. 3,941,936 issued Mar. 2, 1976 to K. Graham et al entitled Telecommunications System Using TDM Switching and more specifically FIGS. 5-7 showing recirculating memory for the system and the explanation thereof. The present invention is directed to an improved memory for a system generally of that type. Variations and enlargements of that system are shown in an article by K. Graham entitled "Larger EPABX Retains Low Power Usage" pages 92-96 of the Mar. 15, 1977 issue of Telephone Engineer and Management Magazine published by Harourt Brace Jovanovich.

In the system shown, a fixed number of time slots are provided, with each time slot or an allotted one of a group of time slots representing specific functions to be performed in the call processing. Thus, one specific time slot or one of a group of time slots is used as the dialed digit register, another one or one of a group functions as a trunk, another as a link circuit, etc. Call processing comprises the transfer of address data representing calling and called lines from a time slot representing one function to a time slot representing the next function of a sequence necessary to complete a call.

The data representing a calling line is stored during a time slot within a location corresponding to that slot in the recirculating memory system for originating lines and in a like manner for the memory for terminating lines. During certain operational intervals or channel scan of time slots, data is transferred from one time slot to another or deleted, where necessary. If no transfer is made, the same data remains in the time slot memory, and is recirculated. In the cited patent and the article, the main memory is a 64-bit shift register, sixteen bits wide to provide eight bits for calling line designation storage and eight bits for called line designation storage.

Within the present invention, the recirculating memory is located within a memory network, shown in block form as memory 14 for terminating line data, and as a memory circuit 12 for the originating line data. Both networks 12 and 14 are essentially identical each having the components shown for network 12 and both being synchronized through receipt of input from a common time slot counter 16 and ROM 18.

The main component for each network is a RAM 20 with 64 memory locations, and at least 12 bits per location. This RAM function may be performed by using three 256×4 RAM's as sold by Intel Corp. under part number 2101A. These RAM's are static devices with non-destructive read-out and separate input and outputs. Each memory location represents a time slot of the time division multiplex switching arrangement, and each location is used to store the address of a station associated with that time slot for a particular call processing function. Five serially positioned latches 22, 24, 26, 28 and 30 are provided, these being tristate, edge-triggered latches also noted as A-E respectively. Each latch is capable of storing twelve bits of data, eight being address data and four being command signals. The function of these latches may be performed by respective Octal Type D Latches sold by Texas Instruments, Inc. under part number SN 74S374. These latches or flip-flops have a three state output. Data from an addressed location of a memory is read out of the RAM memory in parallel during one time slot and the data is stored on latch 22. During the next time slot, the data from latch 22 is transferred to latch 24, and data from the next time slot is stored in latch 22. Data words of 12-bit length are recirculated through successive latches 26 and 28 during successive time slots. In the subsequent time slot, the data from latch 28 is transferred to a final stage latch 30 for buffer storage prior to return to storage in the RAM at its addressed location corresponding to the time slot address representing the data.

Each RAM (that of the terminate as well as RAM 20 of the originate side) is addressed from a programmable ROM 18 simultaneously to maintain both RAM's in synchronism. The ROM function may be performed by a programmable read only memory such as that sold by Texas Instruments, Inc. under part SN 74LS471 organized as a 256×8 bit ROM. The ROM 18 is clocked by a time slot counter 16 to advance the ROM count and address the next area in both RAM's (originate and terminate). Input to the counter 16 is from a source (not shown) of timed clocking pulses fed at a suitable rate. This counter may be a synchronous presettable counter such as that sold by Texas Instruments as part SN 74S163 (two counters being used).

Each time slot is divided into two halves designated $\overline{T4}$ or high and T4 or low, respectively.

The output of the time slot counter 16 is used to address the ROM memory 18. The output of the ROM memory is, in turn, used to address memory locations in the RAM memory. With the $\overline{T4}$ clock low (last half of the time slot), the output of the ROM memory will be the address of the location in RAM memory corresponding to the next time slot data to be read out of RAM 20. For example, if time slot counter output reads 31, the ROM output will address the 31st location in RAM memory.

When the $\overline{T4}$ clock goes high (at the beginning of the next time slot), the data out of the RAM is read out of the memory over the parallel conductors and stored in latch 22. With the data latched in latch 22 and presented at the output of latch 22 for the entire time slot, the data from the RAM memory may be changed with no adverse effects. Thus, when $\overline{T4}$ clock next goes high, it will cause the output of the ROM memory to change the address in the RAM memory corresponding to the data now present at its "data in" port. In the stated example, this would be the data associated with time slot 31 minus 4 or time slot 27. Therefore, the 27th location in RAM memory would be addressed Latches A/E are all similar in that they are all clocked by the positive edge of $\overline{T4}$, which occurs at the beginning of each time slot. In this manner, the data is passed from the previous latch to the next latch at the beginning of each time slot.

A station address is fed from the RAM 20 to latch A during the proper time slot and is stored at the beginning of the time slot on the $\overline{T4}$ pulse. The station address is retained in the RAM memory however. From latch A, the data is fed out during the next time slot. Data from the latch is sent to the buffer drivers 40 to enable the system control to look at the data. If the data is to be changed, the corrected data is sent to the buffer drivers for storage in the B stage latch. An indication of the need for change is transmitted on the PL or enable control lead, along with the new data. The indication of need for change is stored in Data Changed Memory.

The new data is transferred to the B latch and the old data is erased. The tri-state latch will enable one or the other of the inputs, i.e., old data or new data.

At the output of the B latch stage, the station address data is fed to a comparator network 42 for comparison with data received from the system logic to indicate conditions such as a call waiting to be handled indicating a need for storage of the station address data in a proper time slot. Other inputs for comparison at this stage may be preparation for line scan at one specific time slot near the end of a frame, and/or special services such as the need for an attendant or preparation of a conference.

Data from the B latch stage is transferred to the C stage without any change. At the C stage, data may be changed. Under control of the system logic or processor, data may be fed to the C latch from the system logic for storage. An indication of this change is fed to one input of gate G2 to store an indication of data being changed at this latch stage.

Data from the system logic is also sent to the buffers 44 for comparison within the comparator network with data circulating in specific time slots. The comparator compares the information received from the buffers representing past scans with that received from the B latch output to store information in the function memories 46 for notifying the control of various conditions. The data fed to the originate comparator network is also fed to the terminate comparator network to provide data to both for analysis. Data from the C stage latch is transferred to the D latch stage.

At the D stage, data may be changed by the clear originate function which clears the data at this point. An indication of this change is fed to the G3 gate to the Data Changed Memory 60 in the D4 slot to provide this indication. The data at stage D is presented to the system via the Line Scan Driver 50. The Data Changed Memory 60 may be a hex D type flip-flop such as that of Texas Instruments 74LS174.

During the next time slot, the data from the D stage is transferred to the E stage and is thereafter transferred back to a RAM input.

The gating network comprising the Read/Write Control 52 receives an enabling input 62 from the Data Changed Memory only if data has, in fact, been changed at the A latch, the B latch or the D latch. With an enabling input, the recirculating data from latch E is stored in place of the previously stored data. If no enabling input is received from the Read/Write Control and the Data Changed Memory, then the RAM data is maintained and data in the recirculating latch chain is ignored.

The memory 60 is comprised of four D type flip-flops.

Figure 2:
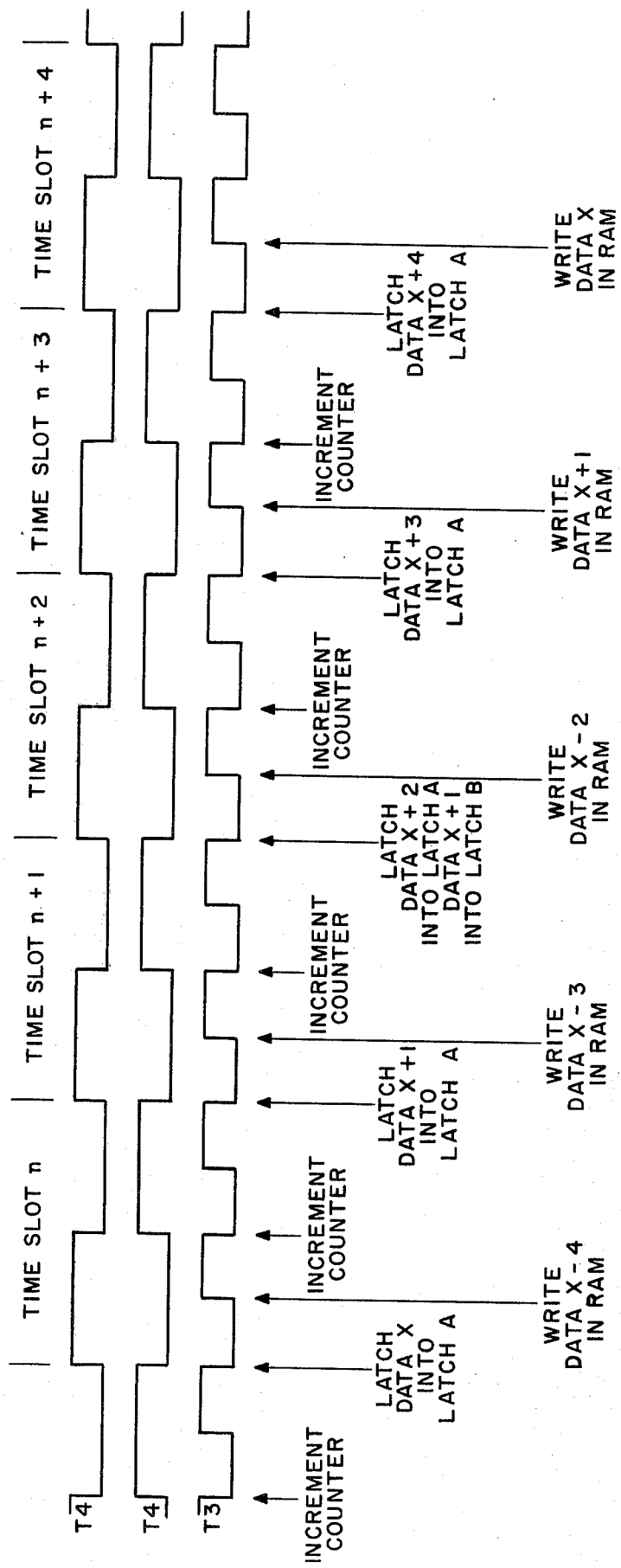
FIG. 2 is a timing chart for use with the diagram of FIG. 1.

In FIG. 2, I show a cycle timing chart based on a cycle of time divided into a number of divisions or slots, assuming 64 time slots. One complete cycle of clock T4 describes a time slot. The beginning of a time slot occurs with each negative-going edge of the T4 clock. Clock T3 is a clock which is twice the frequency of $\overline{T4}$. T4 is T4 inverted. Data passes serially through the latch chain during respective time slots for successive evaluations at the entry to the RAM as either storage of new data or retention of old data, dependent on the condition of the changed data memory.

Data read out from the RAM at an addressed location passes in parallel over the DATA Out leads, there being twelve such leads shown, one of each bit of a number and/or message. The Data Out leads pass the data to a latch A, the first of a set of the serially positioned latches A-E. Latches A-E are essentially identical, each being comprised of a suitable number of flip-flops, one for each data bit transferred, are provided with twelve data input leads, twelve data out leads (shown only as a single conductor) and various control leads.

Briefly restating the operation of the system, a signal designated SCO is present at the beginning of each cycle of time. If the cycle of time is divided into 64 slots designated time slot 0 through time slot 63, then the signal SCO is present during time slot 0. This signal is used to reset the time slot counter 26 to 0. The time slot counter, as is conventional, is a counter which is incremented with each successive time slot.

The outputs of latches A/D are presented to the system circuitry for utilization. The system circuitry at each step has the capability to inhibit the data out of the latch since the latches have "tri state" outputs. By inhibiting the data out the outputs of the latches are temporarily forced into the "high impedance" state, but the data is still maintained within the latch placing new data at the input of the next latch. This new data would be latched into that next latch at the beginning of the next time slot.

The same signal which is used to inhibit the data out of a particular latch is clocked into the Changed Data Memory as a signal that the data was changed at that stage. The "data changed" signal from each stage is logically "ORed" (by gates G2 and G3 or the enable signal) along with the "data changed" signal which was stored at the previous stage, and the result of this operation is then clocked into the Changed Data Memory. When the changed data signal appears, data from the recirculating latch chain is substituted for that of the RAM, otherwise the RAM data is retained, and the recirculating data is ignored.

I claim:

1. A memory system for a time division telecommunications system in which address data is stored, and in which the address data may be changed only during a predetermined group of time slots of a time division frame, said memory system including a random access memory (RAM) in which there is a memory location for each time slot, a serial chain of latch means for receiving and temporarily storing address data from said memory, during the time slots of said group, means associated with certain of said latch means for changing address data while the data is stored at said certain latch means, a further memory with locations associated with said certain latch means for storing an indication of a change of address data, means for feeding changed address data from the final latch means into said RAM for storage therein only when an indication is received from said further memory indicating an address data change has been made.

2. A memory system as claimed in claim 1, in which said further memory comprises a plurality of flip-flops serially disposed to a receive an indication of address data change from respective ones of said means.

3. A memory system as claimed in claim 2, in which there is a gating network responsive to signals from said further memory for enabling said RAM for the storage of changed address data from the final latch means.

4. A memory system as claimed in claim 3, in which said system includes a RAM for originating data, another RAM for terminating data and a read only memory (ROM) for maintaining synchronism between said RAM's and in which there is a clock timer for sequencing said ROM, said RAM, said latch means and said further memory simultaneously to maintain correspondence between time slots.

5. In a time division communications system in which address data is sequentially stored in time slots of the time division frame and in which the address data may be simultaneously changed for more than one time slot, the invention in which there are random access memories (RAM's) with separate memory locations for the address data of each time slot in both a call-originating memory and in a call-terminating memory, a read only memory (ROM) for addressing locations in said RAM's for sequential read out therefrom to separate temporary storage networks for both the originate memory and terminating memory, each said storage network including a plurality of temporary memory stages receptive of data in a serial chain from the prior stage during successive time slots, means for changing data in said temporary, memory stages, a data changed indicator memory for each storage network means in each network, responsive to the change of data in a time slot of its network for forwarding an indication of a change having been made during a particular time slot to said data changed memory, and means for transmitting said indication to the respective RAM to enable storage of said changed data in the proper time slot within the respective RAM.

6. In a system as claimed in claim 5, wherein said each temporary storage network comprises a plurality of multiple bit parallel storage members in a sequential chain in which data is transferred during each successive time slot to the succeeding member and in which the final member of said chain transmits data to its RAM as addressed by said ROM.

7. In a system as claimed in claim 6, each said data changed indicator memory comprises a serial chain of temporary storage members through which an indication is transmitted serially, and a gating network responsive to the final transmission from each said chain to enable its random access memory on the occurrence of a transmitted change indication.

* * * * *